Figures 1, 2:
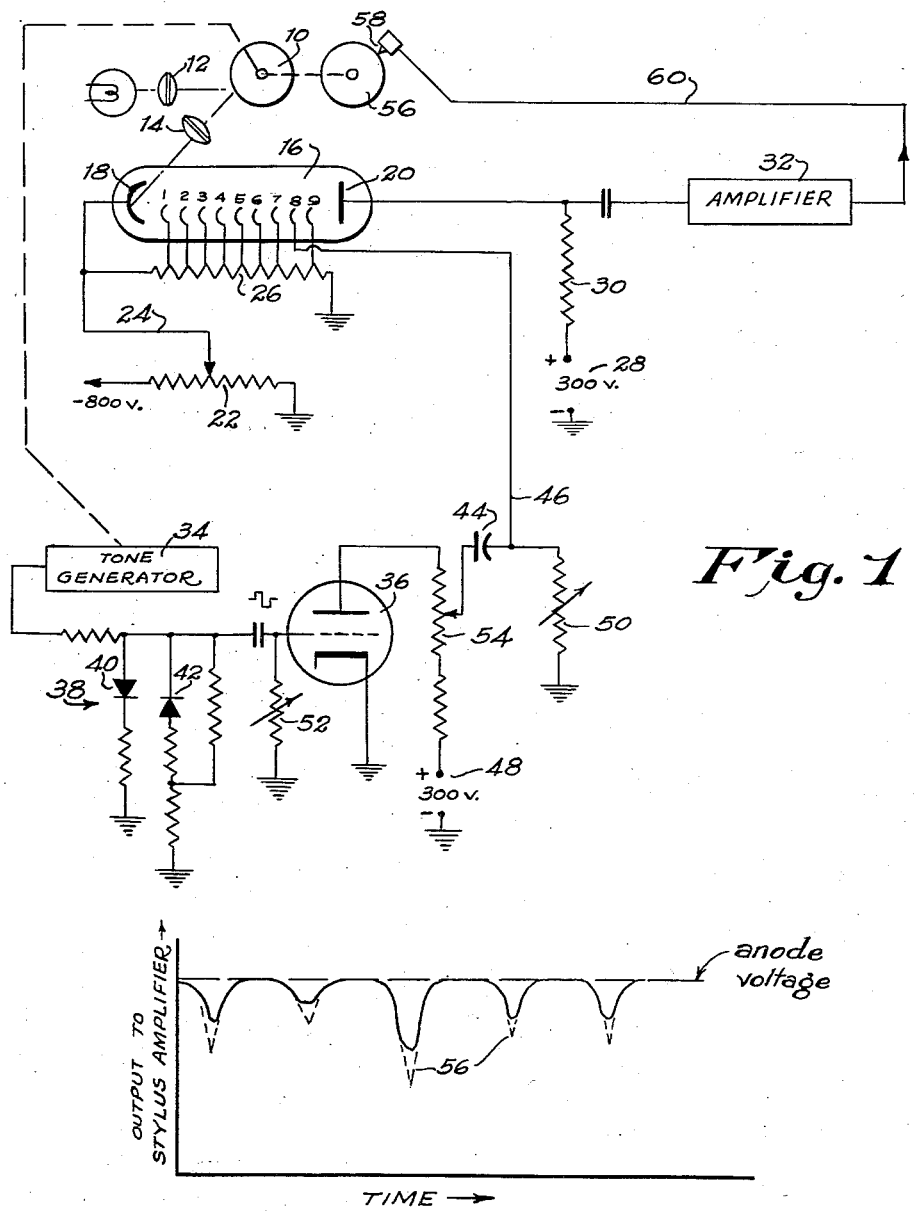

RE 25020

Aug. 5, 1958  M. M. NEEB  2,846,500
PHOTOMULTIPLIER CIRCUIT WITH OUTPUT MODULATION
Filed May 27, 1954  2 Sheets-Sheet 1

INVENTOR:
MELVIN M. NEEB,
BY Homer R. Montague
ATTORNEY

MELVIN M. NEEB,
INVENTOR,

United States Patent Office 2,846,500
Patented Aug. 5, 1958

2,846,500

PHOTOMULTIPLIER CIRCUIT WITH OUTPUT MODULATION

Melvin M. Neeb, St. Albans, N. Y., assignor to Fairchild Camera and Instrument Corporation, a corporation of Delaware Application May 27, 1954, Serial No. 432,862

9 Claims. (Cl. 178—6.6)

This invention pertains to light sensitive devices, and more particularly to a circuit arrangement by which the output of a photocell of the electron multiplier type may have superimposed thereon an alternating component.

In many applications for photosensitive devices, it is desirable to provide an output current or voltage which is essentially a carrier current or voltage, upon which the variations in sensed light intensity are superimposed. The problem of subsequent amplification of the variations is thereby made simpler. Another application in which such an output is desirable lies in the field of photoelectrically controlled reproducing apparatus, such as facsimile or photoelectric engraving apparatus, in which it may be desired to provide a screen pattern, as will be elaborated hereinafter.

Prior efforts to provide the modulated output referred to above have principally been of three types: (a) the use of a mechanical chopper for periodically interrupting the light beam passing to the cell, (b) the use of an exciting lamp whose intensity can be rapidly varied, such as a gaseous discharge lamp and (c) application of a periodic electromagnetic field to the electrons forming the discharge of the cell itself. All these systems are practical for certain applications, but all have disadvantages. Thus, the chopper cannot be used with systems in which the carrier frequency must be rigorously controlled, unless elaborate equipment is provided for maintaining constant speed at the chopper drive motor or vibrator. The gaseous exciting lamp is usually expensive, and of course cannot be used where natural light or other uncontrollable illumination excites the cell. The magnetic modulation is rather unreliable and unstable, and depends upon adequate shielding from stray fields.

An instance of an application where none of the prior systems is completely satisfactory is in the use of a multiplier photocell for controlling the engraving stylus of a photoelectric engraving machine, such as described in the U. S. patent to J. A. Boyajean, No. 2,575,546, dated November 20, 1951. As there disclosed, the photomultiplier senses light reflected from an original, such as a photograph, from a scanning optical system which illuminates a small spot of the original material. To generate a screen plate, as contemplated in that patent, it is necessary to superimpose upon the photocell output a frequency which is precisely related, in frequency and phase, to the rotation of a pair of drums which carry the original and the plate being engraved.

In the Boyajean patent, this modulation was accomplished by using, as the exciting light, a gaseous type of crater lamp capable of responding to rapid changes in its supply voltage. The lamp supply was derived from a tone generator driven from the same shaft which carried the drums, suitably amplified. However, a lamp of suitable size gave barely sufficient illumination to render the machine wholly reliable in daylight operation, and the lamp was expensive and short lived.

With the above considerations as background, it is a principal object of the present invention to provide a photomultiplier output circuit which will produce the desired modulation purely electrically, without the use of motors or the like, and without the necessity for a special high-speed light source. The invention permits a simple incandescent lamp to be used as the exciter lamp, and involves a minimum of special circuit components. The carrier frequency is derived from the same tone generator as was formerly used to energize the gaseous exciter lamp, so that problems of frequency and phase are minimized.

Figure 3:
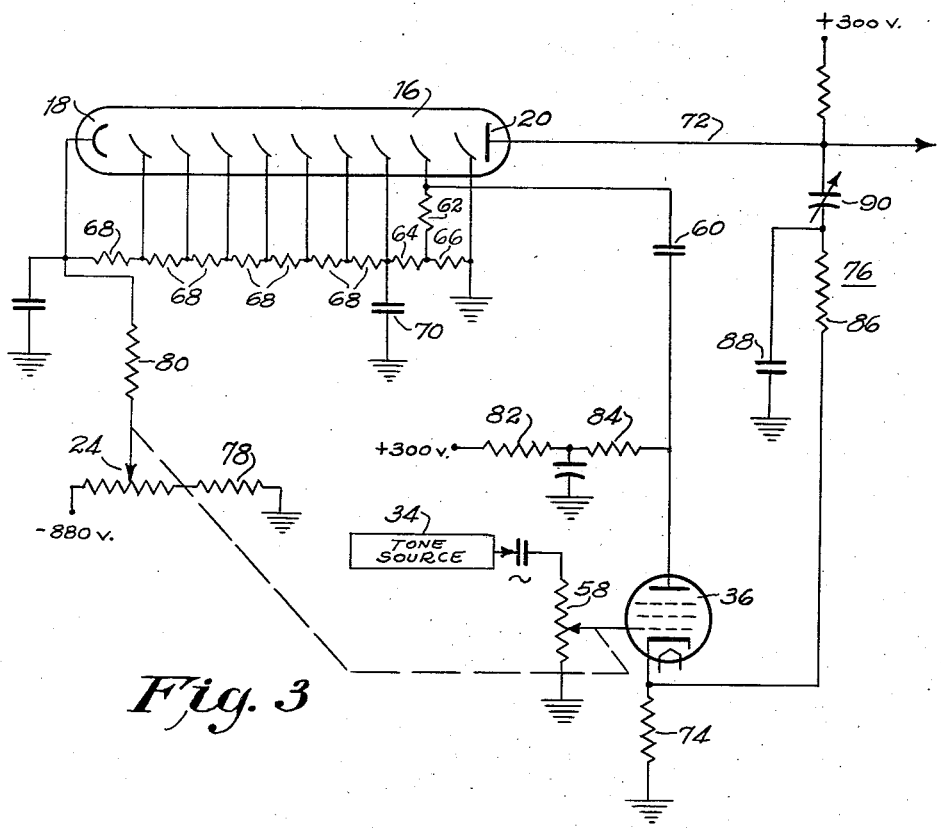

The invention itself will best be understood by considering the following detailed specification of a preferred embodiment thereof, taken in connection with the accompanying drawings, in which:

Fig. 1 is a schematic view of the essential elements of the invention, partly in block form, Fig. 2 is a graphical representation of the form of the output signal of the photomultiplier cell, and Fig. 3 is a schematic view of a modified form of the invention.

Basically, the invention depends upon the fact that the output of a photomultiplier can be varied by controlling the voltage applied to one of the dynodes or successive accelerating electrodes, specifically to the next to the last dynode before the photoelectrons reach the anode thereof.

Referring now to Fig. 1 of the drawings, the ground symbol is to be understood as meaning any common return conductor for the various circuits. It may or may not be the chassis or frame of the apparatus. In the figure, numeral 10 designates the drum of an engraving machine of the kind shown in the Boyajean patent, specifically the drum carrying the original to be duplicated. An exciting lamp, which may be a concentrated filament incandescent lamp, is energized from any suitable constant voltage source, and its light is concentrated upon a scanning spot on the material secured to drum 10, as by optics 12. After reflection from the matter, the light is relayed by optics 14 to the multiplier photocell 16, which may for example be the type known as the 931–A having a cathode, an anode and nine dynodes.

The photocathode of tube 16 is designated by numeral 18, the anode by 20, and the dynodes by numbers indicating their positional order from cathode to anode. Actually, the dynodes are not arranged as shown, but are staggered, the showing in the drawing being simplified in this respect. A conventional voltage supply is indicated for the multiplier tube, comprising a voltage divider 22 connected at one end to a source of voltage 800 volts negative with respect to ground, from which a lead 24 picks off a negative voltage which is applied across a dynode voltage divider 26 to successive taps on which the first seven and the ninth dynode are connected. This provides the potential gradient from cathode through the dynode array required for multiplier operation.

The anode or collector of the tube 16 is supplied with suitable positive potential from a source 28 via resistor 30, and the multiplier output is conveyed to a conventional amplifier 32 for use in driving the engraving stylus of the prior patent.

The tone or screen generator of the mentioned patent is indicated by numeral 34, and for the present purposes its alternating frequency output is delivered to the control grid of an amplifier tube 36. Between the generator and tube 36 is connected a conventional form of dual clipper circuit 38 comprising a pair of reversely connected diodes 40, 42, to supply the grid of tube 36 with a squared wave shape as indicated on the drawing. The output of tube 36 is conveyed by coupling capacitor 44 and lead 46 to the eighth dynode of the multiplier tube 16. Anode supply for tube 36 is indicated at 48, and a variable resistor 50 permits the tone output to be adjusted to compensate for unavoidable differences between different photomultiplier tubes 16. Other means for adjusting the voltage output of the tube 36 may obviously be employed, such as a variable resistor 52 indicated as connected between grid and ground, or a potentiometer allowing a desired fraction of the clipped tone generator output to be supplied to the grid-cathode circuit. Similarly, the output may be adjusted by a potentiometer 54 in the output circuit. Ordinarily, one such control will suffice, the plural adjustable controls indicated in Fig. 1 being merely indicative of alternative possibilities.

It has apparently been supposed by those expert in the art that modulation could not be supplied successfully to the dynodes of a multiplier tube, and efforts to modulate on the last dynode have proved unsuccessful, since control could not be maintained (e. g., the no-light output signal became large), and the dynode is too sensitive to voltage changes to provide reliable operation. With the circuit of this invention, however, reliable modulation is obtained in a very simple and direct manner.

Application of modulating voltages to all of the dynodes resulted in a hopelessly large dark signal; i. e., output with zero illumination. Even with shielding of the leads little improvement could be obtained. In other tests, by way of example, with modulation applied to three dynodes (Nos. 4, 5 and 6 of a Type 931A photomultiplier) from taps of a modulation transformer secondary, the dark signal was still too great and the maximum output voltage small, e. g., the dark signal was between 1½ and 2 volts with a maximum output of about 17 volts. With modulation applied between the eighth and ninth dynodes, the output from the multiplier anode increased to 95 volts with a dark signal of .045 volt. A part of this increase is attributable to careful focussing of the optics of the system. This connection of the modulation voltage between the eighth and ninth dynodes, since the ninth is substantially grounded, amounts to putting the entire modulation on the eighth dynode in Fig. 1. Such a system is nearly as suitable as that illustrated in Fig. 1.

The nature of the composite output of the circuit is illustrated in Fig. 2, which shows graphically the form of the output supplied to the stylus drive motor, plotted against time. The actual shape of this wave will depend, of course, upon the relative amplitudes and frequencies of the carrier frequency from generator 34 and the variations produced by the input illumination to the multiplier.

Two purposes for the double clipping circuit of Fig. 1 become more apparent from an inspection of Fig. 2. First, it eliminates "Wow," or amplitude variations from the tone generator 34 to the grid electrode of tube 36. Second, it pre-shapes the wave output of tube 36 to the eighth dynode of the photomultiplier and thus avoids the peaking which would occur (see the dotted peaks 56 in Fig. 2) without this shaping effect. The modulation is always downward from the maximum level indicated by the legend "Anode voltage." If desired, this output can be made more nearly sinusoidal, before or after it is applied to the amplifier 32 by the use of additional known shaping circuits.

The application of the above modulating arrangement to a photoelectric engraving machine of the type described in the Boyajean patent mentioned above will in part be clear from the above description. In that patent, the tone frequency generator which generates a tone producing the screen pattern on the engraved plate is driven from the same shaft which carries the scanning drum 10 and the drum carrying the plate being engraved. For completeness, the drum carrying the engraving is shown in Fig. 1 at numeral 56 and is shown as coaxial with scanning drum 10 as it is described in the patent. The dash line between drum 10 and the tone generator 34 indicates that the tone generator is operated in synchronism with the rotation of the two drums. Also, numeral 58 indicates schematically the engraving stylus operating upon an engraving sheet affixed to drum 56, said stylus being controlled by a transducer of the type shown in the patent and energized from amplifier 32 over a channel or circuit designated 60. Since these details form no essential part of the present invention, they are shown only schematically to indicate to those skilled in the art the general manner in which the invention may be applied to a photoelectric engraving machine.

It is possible to omit the wave shaping circuits mentioned above, without excessive departures from a sine wave output from the photomultiplier anode 20, by biassing the number 8 dynode negative with respect to the number 9 dynode, but by a reduced value as compared the D.-C. voltage difference between the other dynodes. In such a case, the amplitude of the modulating signal from source 34 should be reduced, and the maximum photomultiplier anode output signal will be somewhat smaller. The leakage signal (corresponding to zero light input to the photomultiplier) will normally be excessive unless the precaution is taken of bypassing the dynode below number eight, namely number 7, to ground with a small capacitor to reduce this leakage signal. A circuit including this feature, as well as a refinement of the invention, is shown in Fig. 3, which will now be described.

Referring to Fig. 3 of the drawings wherein like numerals indicate the same parts as in Fig. 1, the tone modulation from source 34 is applied to modulating tube 36 through a coupling capacitor and via a voltage divider 58. As in the previous case, the output of modulator tube 36 is applied to the eighth dynode over a coupling capacitor 60, but the eighth dynode is biassed somewhat negatively with respect to the ninth dynode, as by a series resistor 62, whose lower end is tied to the common point of resistors 64 and 66 between dynodes numbers 7 and 9. Thus, if the resistors 68 constituting the remainder of the supply string are 220,000 ohm resistors, resistor 64 may have a value of 300,000 ohms, and resistor 66 a value of 120,000 ohms. A small bypass capacitor 70 is shown connecting the seventh dynode to ground, as described in the preceding paragraph.

As in the embodiment earlier described, the modulating signal amplified by tube 36 is applied to the eighth dynode thereby to produce from the anode of the photomultiplier a signal for control of the engraving transducer, the signal output lead being indicated at 72. Additional amplification is of course provided as before, the output amplifier being omitted from this figure for purposes of simplification. Modulator tube 36, in this case, performs an additional function which is of importance where the shaping circuits are omitted and the photomultiplier output correspondingly reduced to ensure approximately sinusoidal output. This is the feedback compensation of leakage signal which would otherwise produce a substantial output voltage under conditions of zero light input to the photomultiplier.

To this end, a nulling feedback or compensating signal is derived from tube 36, and applied to the anode of the photomultiplier. In Fig. 3, this voltage is shown as being derived from the cathode resistor 74 to provide opposite phase to that delivered by the photomultiplier to output lead 72, but obviously it could be equally well derived from any other point in the circuitry of tube 36 at which the amplitude changes proportionately to the magnitude of the modulating signal. This feedback voltage is applied to output lead 72 through a phase adjusting network 76, and the phasing network is adjusted to produce minimum output signal to the following stages with a normal value of modulating signal from source 34, the adjustment being made with no voltage supply to the dynodes of the photomultiplier. As so adjusted, it was found possible to reduce the dark signal produced with zero light excitation to a value of 0.0015 volt for normal values of modulation amplitude and with voltage applied to the photomultiplier dynodes.

Since both the adjustable potentiometer controls 24 and 58 affect the sensitivity of the circuit, they may conveniently be ganged for simultaneous adjustment, and if this is done the proper modulation and feedback amplitudes will be approximated for all values of adjusted sensitivity. A successful circuit of the Fig. 3 type, using a commercial type 931-A or 1P21 photomultiplier and a type 6AG7 modulator tube, used the following circuit values:

| | |
|---|---|
| Resistor 24 | 1 megohm. |
| Resistor 78 | 470,000 ohms. |
| Resistor 58, 80, 62 | 100,000 ohms. |
| Resistor 68 | 220,000 ohms. |
| Resistor 64 | 300,000 ohms. |
| Resistor 66 | 120,000 ohms. |
| Resistor 74 | 390 ohms. |
| Resistor 82 | 4,700 ohms. |
| Resistor 84 | 30,000 ohms. |
| Resistor 86 | 82,000 ohms. |
| Capacitor 88 | 700 mmfd. |
| Capacitor 90 | 4 to 20 mmfd. variable. |
| Capacitor 60 | 1.0 mfd. |

While the invention has been described herein in considerable detail with reference to certain specific and preferred embodiments thereof, it is to be understood that this description is intended for purposes of disclosure and illustration, and not of limitation. The principles of the invention can be carried out with other circuit arrangements, and for also producing a modulated photomultiplier output for purposes other than in connection with photoelectric engraving. Such modifications as fall within the scope of the appended claims are intended to be covered by this invention.

What is claimed is:

1. In combination, a photomultiplier tube having at least a photosensitive cathode, a plurality of secondary emission dynodes, and an output electrode, means for exciting said cathode with a light input signal varying in amplitude, a voltage supply connected to said cathode and to certain of said dynodes to maintain said certain dynodes positive with respect to the potential of said cathode, means for maintaining said output electrode continuously at a positive potential with respect to said cathode and to all of said dynodes, a source of alternating potential connected between said cathode and a certain other of said dynodes to modulate the current drawn by said output electrode, and an output circuit energized by the current drawn by said output electrode.

2. The combination of claim 1, in which said certain other dynode is the last dynode but one counting from the cathode to the anode.

3. The combination of claim 1, including means for maintaining the maximum positive potential applied to said other dynode at a predetermined value with respect to said cathode.

4. A circuit for modulating the output current of a photomultiplier tube at a predetermined frequency, comprising a photomultiplier tube having a cathode, an anode and a plurality of secondary emission dynodes, a power supply circuit for maintaining all but one of said dynodes at fixed graded positive potentials with respect to said cathode, an output circuit for maintaining said anode positive with respect to all of said dynodes, a tone source of alternating voltage, a clipper circuit connected to said source, and means for applying positive potentials only from said clipper circuit between said cathode and the remaining dynode to maintain the latter at potentials varying in positive value at the frequency of said source.

5. A circuit in accordance with claim 4, including an output amplifier coupled to the output circuit of said anode.

6. A circuit in accordance with claim 4, in which said remaining dynode is the last but one counting from said cathode to said anode.

7. A circuit for modulating the output current of a photomultiplier tube at a predetermined frequency, comprising a photomultiplier tube having a cathode, an anode and a plurality of secondary emission dynodes, a power supply circuit for maintaining all but one of said dynodes at fixed graded positive potentials with respect to said cathode, an output circuit for maintaining said anode positive with respect to all of said dynodes, a tone source of alternating voltage, a clipper circuit connected to said source, and a vacuum tube device for applying positive potentials only from said clipper circuit between said cathodes and the remaining dynode to maintain the latter at potentials varying in positive value at the frequency of said source.

8. In photoelectric engraving apparatus of the type including a scanning drum, an engraving drum and a motor-actuated stylus arranged to engrave a sheet held on said engraving drum, the improvement which comprises, in combination, a photomultiplier tube arranged to scan material on said scanning drum and having at least a photosensitive cathode, a plurality of secondary emission dynodes, and an output electrode, a voltage supply connected to said cathode and to certain of said dynodes to maintain said certain dynodes positive with respect to the potential of said cathode, means for maintaining said output electrode continuously at a positive potential with respect to said cathode and to all of said dynodes, an alternating current screen generator driven in synchronism with said drums and connected between said cathode and a certain other of said dynodes to modulate the current drawn by said output electrode, an output circuit energized solely by the current drawn by said output electrode, and means for controlling said stylus from said output circuit.

9. The invention in accordance with claim 7, including means for adjusting the magnitude of the modulating potential applied to said dynode.

References Cited in the file of this patent

UNITED STATES PATENTS 2,369,206    Barnes _____ Feb. 13, 1945